United States Patent
Delattre et al.

(10) Patent No.: US 9,787,970 B2
(45) Date of Patent: Oct. 10, 2017

(54) METHOD FOR CALIBRATING A STEREOSCOPIC PHOTOGRAPHY DEVICE

(75) Inventors: Alexandre Delattre, Viroflay (FR); Jérôme Larrieu, Hasparren (FR)

(73) Assignee: NINTENDO EUROPEAN RESEARCH AND DEVELOPMENT SAS, Paris (FR)

( * ) Notice: Subject to any disclaimer, the term of this patent is extended or adjusted under 35 U.S.C. 154(b) by 478 days.

(21) Appl. No.: 14/000,483

(22) PCT Filed: Feb. 22, 2012

(86) PCT No.: PCT/EP2012/052973
§ 371 (c)(1),
(2), (4) Date: Dec. 3, 2013

(87) PCT Pub. No.: WO2012/113810
PCT Pub. Date: Aug. 30, 2012

(65) Prior Publication Data
US 2014/0204181 A1    Jul. 24, 2014

(30) Foreign Application Priority Data
Feb. 24, 2011  (FR) .................................... 11 51499

(51) Int. Cl.
*H04N 13/02*       (2006.01)
*G06T 7/80*        (2017.01)

(52) U.S. Cl.
CPC .......... *H04N 13/0246* (2013.01); *G06T 7/85* (2017.01); *H04N 13/0239* (2013.01); *G06T 2207/10012* (2013.01)

(58) Field of Classification Search
CPC .............. H04N 13/02; H04N 13/0246; H04N 13/0239; H04N 13/0425; H04N 13/0497;
(Continued)

(56) References Cited

U.S. PATENT DOCUMENTS 5,179,441 A * 1/1993 Anderson ................ G06K 9/32
                                                         348/43
5,383,013 A * 1/1995 Cox ...................... G06T 7/0075
                                                         348/E13.014
(Continued)

FOREIGN PATENT DOCUMENTS

JP    11(1999)-27703    2/1999

OTHER PUBLICATIONS

"Camera Calibration with Distortion Models and Accuracy Evaluation" by Juyang Weng et al., 0162-8828-92303, XP000328810 © 1992 IEEE.*
(Continued)

*Primary Examiner* — Dramos I Kalapodas
(74) *Attorney, Agent, or Firm* — Nixon & Vanderhye PC

(57) ABSTRACT

The present invention concerns the field of stereoscopic photography devices and more precisely calibration thereof. The invention proposes a method for calibrating a stereoscopic photography device that calculates a set of correction parameters for the images. These parameters are classed according to an order of importance. The first-order correction parameters are estimated first, the second-order correction parameters secondly. Advantageously, the first-order parameters are refined by taking account of the estimation values of the second-order parameters. Advantageously, a measurement of the relevance of the scene is carried out before the actual calibration.

7 Claims, 2 Drawing Sheets

(58) Field of Classification Search
CPC ....... H04N 2013/0077; H04N 13/0422; H04N
2013/0081; H04N 13/0445; H04N
13/044; H04N 13/0275; H04N 13/004;
H04N 13/246; H04N 19/597; H04N
19/63; H04N 7/0806; H04N 17/002;
G06T 7/002; G06T 2207/10012; G06T
5/006; G06T 7/0075; G06T 7/0073; G06T
2207/10021; G06T 7/0018; G06T
2207/30036; G06T 2207/10024; G06T
19/006; G06T 7/10; G06T 7/103; G06T
2207/30252; G06T 2207/20076; G06T
2207/20016; G06T 7/85; G02B 27/22;
G02B 27/0172; G02B 2027/0178; G02B
27/017; G06F 3/0481; G06F 3/04847;
G06K 9/6297; G06K 9/00; G06K 9/32;
G01C 3/08; G01C 11/06; G01S 11/12
See application file for complete search history.

(56) References Cited

U.S. PATENT DOCUMENTS

| | | | | |
|---|---|---|---|---|
| 5,915,033 | A * | 6/1999 | Tanigawa | G01C 3/085 348/349 |
| 6,437,823 | B1 * | 8/2002 | Zhang | H04N 17/002 348/187 |
| 7,023,473 | B2 * | 4/2006 | Iwai | G01C 3/08 348/187 |
| 7,139,423 | B1 * | 11/2006 | Nicolas | G06T 7/579 382/106 |
| 7,224,357 | B2 * | 5/2007 | Chen | G06T 7/0075 345/419 |
| 7,742,635 | B2 * | 6/2010 | Rohaly | G06T 7/0018 382/106 |
| 7,808,525 | B2 * | 10/2010 | Katayama | G01C 11/02 348/175 |
| 8,430,299 | B2 * | 4/2013 | Poslinski | H04N 5/44513 235/375 |
| 8,593,524 | B2 * | 11/2013 | Kleihorst | G06T 7/002 348/175 |
| 2002/0167726 | A1 * | 11/2002 | Barman | G01B 11/00 359/458 |
| 2003/0156751 | A1 * | 8/2003 | Lee | G06K 9/03 382/154 |
| 2004/0240754 | A1 * | 12/2004 | Smith | G01B 11/00 382/286 |
| 2006/0083421 | A1 * | 4/2006 | Weiguo | G06K 9/32 382/154 |
| 2006/0206012 | A1 * | 9/2006 | Merrett | A61B 5/0205 600/300 |
| 2008/0256474 | A1 * | 10/2008 | Chakra | G06F 3/0481 715/772 |
| 2010/0164950 | A1 * | 7/2010 | Zhao | G06T 7/0075 345/419 |
| 2010/0220932 | A1 * | 9/2010 | Zhang | G06K 9/6297 382/209 |
| 2010/0295926 | A1 * | 11/2010 | Estrada | G06T 7/002 348/47 |
| 2010/0329513 | A1 * | 12/2010 | Klefenz | G01C 21/00 382/104 |
| 2011/0199491 | A1 * | 8/2011 | Jikihira | H04N 17/002 348/188 |
| 2012/0007954 | A1 * | 1/2012 | Miller | H04N 13/0239 348/46 |
| 2012/0105591 | A1 * | 5/2012 | Kim | H04N 17/002 348/46 |
| 2012/0293327 | A1 * | 11/2012 | Mountain | G06F 3/0481 340/540 |
| 2013/0070108 | A1 * | 3/2013 | Aerts | G06T 7/002 348/187 |

OTHER PUBLICATIONS

"A Flexible New Technique for Camera Calibration" by Zhengyou Zhang, Technical Report MSR-TR-98-71, Dec. 2, 1998.*
"A Versatile Camera Calibration Technique for High-Accuracy 3D Machine Vision Metrology using Off-the Shelf TV Cameras ans Lenses" by Roger Y. Tsai, © 1987 IEEE, Journal of Robotics and Automation, vol. RA-3, No. 4, Aug. 1987.*
"A Versatile Camera Calibration Technique for High-Acurracy 3d Machine Vision Metrology using Off-the Shelf TV Cameras and Lenses", Roger Tsai © IEEE1987_ISSN 0882-4967.*
"An Optimal Solution for Mobile Camera Calibration", P. Puget et al., © IEEE1990-ISBN0-8186-9061-5.*
"Camera Calibration with Distortion Models and Accuracy Evaluation", J. Weng et al., © IEEE1992-DOI10.110934.159901.*
Juyang Weng et al., "Camera Calibration with Distortion Models and Accuracy Evaluation" 0162-8828-92303, XP000328810 © 1992 IEEE.*
R. Tsai et al., "A Versatile Camera calibration Technique for High-Accuracy 3D Machine Vision Metrology Using Off-the-Shelf TV Camera and Lenses", © IEEE1987_ISSN 0882-4967.*
English-language translation of Written Opinion of the International Searching Authority for PCT/EP2012/052973 mailed Sep. 6, 2013.
Weng, J. et al., "Camera Calibration with Distortion Models and Accuracy Evaluation", IEEE Transactions on Pattern Analysis and Machine Intelligence, vol. 14, No. 10, (Oct. 1, 1992), pp. 965-980.
International Search Report for PCT/EP2012/052973, mailed Jun. 5, 2012.
Foreign-language Written Opinion of the International Searching Authority for PCT/EP2012/052973, mailed Jun. 5, 2013.
Translated Japanese Office Action mailed Nov. 10, 2015 for Japanese Patent Application No. 2013-554874.

* cited by examiner

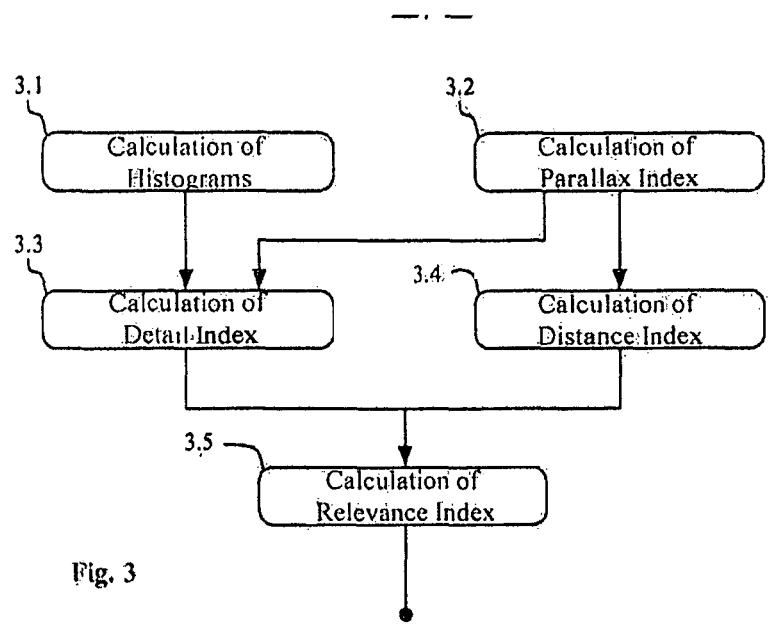
Fig. 3
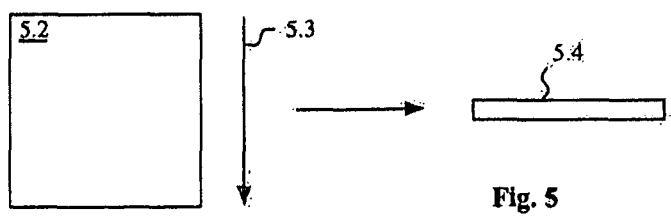
Fig. 4
Fig. 5

METHOD FOR CALIBRATING A STEREOSCOPIC PHOTOGRAPHY DEVICE

The present invention concerns the field of stereoscopic photography devices and more precisely calibration thereof.

Stereoscopic photography devices are tending to become more widespread and can now be sold at reasonable cost. Because of this, these devices are making their appearance in a number of appliances for the general public such as camcorders and cameras and the incorporation thereof in apparatus such as mobile telephones or portable game consoles can be expected. Previously reserved for professional equipment, they are now produced by means of low-cost components.

The general architecture of these devices is illustrated by FIG. 1. They consist of a support 1.1 integrated in the product, which carries two cameras 1.2 and 1.3. These cameras are typically spaced apart by a few centimetres and must ideally be strictly identical. They must also ideally have their optical axes 1.5 and 1.6 parallel. When these conditions are met, it is then possible to take images of a scene 1.4 by means of the system. A left-hand image is obtained taken by the camera 1.2 and a right-hand image taken by the camera 1.3. The objects in the scene 1.4 situated sufficiently far away to be considered to be at infinity are then perfectly superimposable in the two images. Closer objects undergo parallax resulting in a horizontal offset in translation between the two images. This translation is all the greater the closer the object is to the cameras while remaining less than the distance between the cameras.

In this field of general-public products produced on a large scale and at a reduced cost, the quality requirements are less than in the professional field. Because of this, the cameras used are not strictly identical and the positioning of the two cameras is also subject to fairly wide tolerances.

In addition, the general-public aspect of the relevant products gives rise to great variability over time in the environment of the apparatus, which may be subjected to impacts and great variations in temperature. These events have consequences on the physical parameters of the sensors and the positioning thereof.

The consequence of all these phenomena is that it is difficult to obtain reliable stereoscopic information on the left and right images taken by the cameras.

The invention aims to solve the above problems by proposing a method for calibrating a stereoscopic photography device that calculates a set of image-correction parameters. These parameters are classed in an order of importance. The first-order correction parameters are estimated first, the second-order correction parameters second. Advantageously, the first-order parameters are refined, taking into account estimation values of the second-order parameters. Advantageously, a measurement of the relevance of the scene is carried out before the actual calibration.

The invention concerns a method for calibrating a stereoscopic photography device having two cameras for capturing a right-hand image and left-hand image, said device having a plurality of defects, each of these defects being able to be corrected by applying a transformation to at least one of the two captured images, which comprises, said defects being hierarchized in at least two orders, a step of estimating the correction parameters of the defects of a given first order; a step of estimating the correction parameters of the defects of a second order higher than the first order and new step of estimating the correction parameters of the first-order defects, the estimation of the second-order parameters being used for a new estimation of the correction parameters of the first-order defects.

According to a particular embodiment of the invention, the defects that are chosen to be corrected are chosen from: a global translation offset of the image; a horizontal and vertical trapezium deformation; a rotation, a zoom factor and a barrel or pincushion distortion.

According to a particular embodiment of the invention, the first-order defect consists of a total translation offset of the image; the second-order defect consists of a horizontal and vertical trapezium deformation; the third-order defect consists of a rotation and the fourth-order defect consists of a zoom factor.

According to a particular embodiment of the invention, the method furthermore comprises a step of calculating an index of the relevance of the scene.

According to a particular embodiment of the invention, the calculation of an index of relevance of the scene comprises: a step of calculating histograms of the right and left images; a step of calculating the parallaxes on a plurality of areas of the left and right images; a step of calculating an index of details of the scene according to the spread of the histograms and the correlation indices between the areas of the right and left images; a step of calculating a distance index that will be the greater, the more the parallax indices are uniformly low, and a step of forming the relevance index according to the detail index and the distance index.

The features of the invention mentioned above, as well as others, will emerge more clearly from the following description of an example embodiment, said description being given in relation to the accompanying drawings, among which:

FIG. 3 illustrates the flow diagram of the step of measuring the relevance of the scene according to one embodiment of the invention.

FIG. 4 illustrates the division of the image used in one embodiment of the relevance measurement.

FIG. 5 illustrates the rapid correlation calculation method used in an embodiment of the relevance measurement.

Figure 1:
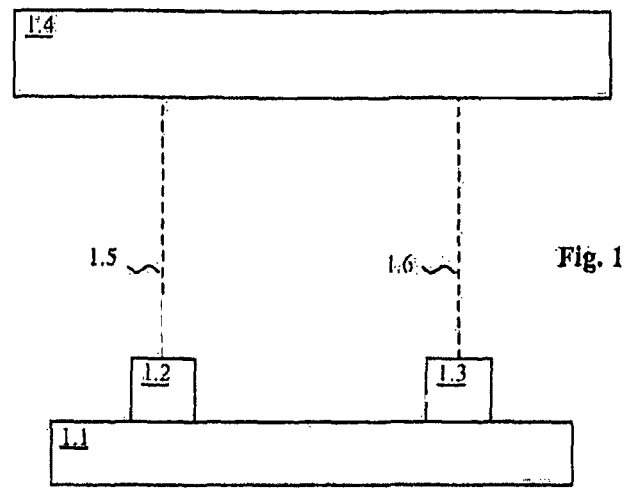
FIG. 1 illustrates the general architecture of a stereoscopic photography device.
Figure 2:
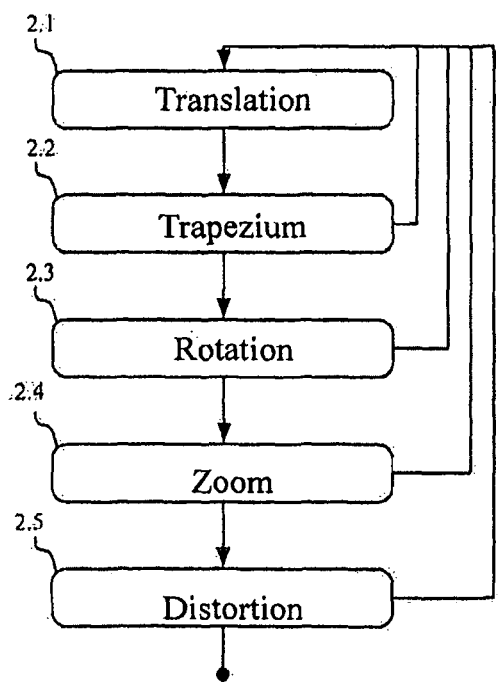
FIG. 2 illustrates the flow diagram of the calibration method according to one embodiment of the invention.

An actual stereoscopic photography system is subject to a certain number of physical imperfections having more or less great consequences on the images captured. The physical placing of the cameras on the support is never perfectly aligned, which means that the optical axes are not perfectly parallel. In order to be able to use the stereoscopy, it is therefore important to correct the effects due to these physical imperfections.

The invention is based on the fact that the various effects to be corrected do not all have the same impact on the stereoscopy. Some are more important than others. Thus several orders are distinguished in the various distortions found in the captured images compared with the images that would be obtained by an ideal system. First-order, second-order, third-order and fourth-order distortions are spoken of.

It should be noted that, according to the camera manufacturing process, the amplitude and therefore the order of magnitude and therefore of correction of each distortion may vary. It will therefore advantageously be possible to change this correction order according to the correction requirement of the moment. Some distortions do not appear on some cameras and avoiding correcting them will advantageously be possible. Other distortions naturally "commute": the estimation and correction of rotation and zoom can be carried out independently, and therefore in any order.

The calibration method therefore consists of estimating the correction parameters that must be applied to the captured images in order to obtain images that are as close as can be achieved to the images that would be obtained by a photography system that had no defect.

To do this, a scene is captured that must have good properties. First of all, the scene must be sufficiently far away for the right and left images to be superimposed. It has been seen that the points of an object in the distance are superimposed in the two images. Any defects in the photography system will distort this superimposition, which it would be sought to regain. The scene must also propose a level of detail allowing a search for an area in the image. An area of uniform colour and brightness would not make it possible to measure the distortions that it is sought to correct. It must also be free from close objects, the parallax of which would interfere with the measurements.

The first-order defect consists of a global translation offset of the image. It is due to the fact that, the optical axes not being perfectly parallel, the scene portion captured by the left-hand camera 1.2 does not exactly correspond to the scene portion captured by the right-hand camera 1.3. It is therefore sought to determine a horizontal translation parameter $\Delta X$ and a vertical translation parameter $\Delta Y$ for resetting the two images. This determination consists of calculating, during a step 2.1, the offset for which the images are correlated. To do this, the example embodiment calculates, for a set of translation values, a correlation coefficient between the right-hand image and the left-hand image. For example, the sum of the absolute values of the brightness differences at each point in the image is calculated. The translation values for which this sum is minimum give us a first estimation of the first-order parameters.

The second-order defect consist of a horizontal and vertical trapezium deformation due to the perspective deformation caused by the non-parallelism of the optical axes of the two cameras. This deformation results in a ratio different from one between the left edge and the right edge of the image for the horizontal trapezium and between the top edge and the bottom edge for the vertical trapezium. These parameters are estimated during step 2.2 by calculating a correlation coefficient for various trapezium values tested. Advantageously, the trapezium being due to a perspective effect resulting from a lack of parallelism of the optical axes of the cameras and this defect causing an associated translation offset, the first-order corrections of translation offset and the second-order corrections related to the trapezium are associated for estimating these parameters. A translation and the associated trapezium effect are then applied to an image during tests aimed at estimating the values of these parameters for which the correlation is the greatest between images.

The third order is the taking into account of a possible rotation of one camera with respect to the other about the optical axes. This rotation causes a rotation of one of the two images with respect to the other about the centre of the image situated on the optical axis of the camera. During step 2.3, this rotation factor is estimated by calculating the rotation coefficient for various values of this rotation factor and the value for which the highest correlation is obtained is adopted.

The fourth order concerns a disparity in viewing angle between the two cameras. This disparity causes a zoom factor between the two images. During step 2.4, the value of this zoom factor is estimated by correlation.

Advantageously, a fifth order can be considered. It relates to effects due to the optical distortions of the camera lenses. According to circumstances, each camera may cause a barrel or pincushion distortion. These distortions show the image as projected onto a concave or convex surface. During step 2.5, these distortions are estimated by correlation.

The distortions may for example be estimated and corrected by a first-order approximation in the form: $f(R)=R+aR^3$ with R the distance or radius between each pixel and the optical centre situated a priori at the centre of the image and $f(R)$ the new position of this same pixel after correction of the distortion. The sign of the correction factor a, which is equal to 0 for a perfect lens, determines whether the deformation is pincushion or barrel.

By comparison, it is then possible to estimate the difference in distortion between the two cameras by "deforming" one so that it corresponds to the other as well as possible.

The important thing is less to correct the absolute deformations of the cameras than to minimise the disparities between the left and right cameras which cause real visual discomfort in stereoscopy.

It is illusory to seek to correct an effect of a given order if the higher-order effects have not previously been corrected. It is also found that the correction of an effect of a given order has an influence on the estimation of the higher-order effects. To improve the estimation of these parameters, the following algorithm is then adopted. An estimation is made of the first-order parameters, step 2.1, and then the estimation of the second-order parameters is passed to, step 2.2, on images corrected using the estimated first-order parameters. A first estimation of the second-order parameters is then obtained. The estimation of the first-order parameters is then refined by applying a correction to the images with the second-order parameters. Next the estimation of the second-order parameters is refined with the new values obtained for the first-order parameters. Advantageously, this loop is continued until a convergence of the estimation of the parameters is obtained. These parameters are next used for estimating the third-order parameters and so on. According to this embodiment, the estimation of the parameters of a given order is used to make a new estimation of the higher-order parameters.

It will be understood that the actual defects that are chosen to be corrected as well as the order in which these defects are corrected may vary according to the systems. The defects cited and the order cited represent only one example embodiment of the invention.

In this way, a set of parameters is obtained that makes it possible to correct the images obtained by coming close to the images that would be obtained if the photography device were ideal. These correction parameters can then be directly used during photography for an immediate correction or attached to the images for subsequent correction. They are usable both for a single shot of the photographic type or during a series of shots in an application of the video type.

We have seen that the efficacy of this calibration method depends partly on the scene chosen for the photography used for estimating these parameters. This scene must be sufficiently far away, comprise a level of detail allowing reliable correlations and not contain close objects the parallax of which would interfere with the correlation operations. Since this calibration method can be implemented on demand throughout the life of the apparatus, it can be used by a user unfamiliar with these constraints. To assist this user to choose a relevant scene for implementing the calibration method, a step of measuring an index of relevance of the scene is added to this method. Advantageously, the result of this measurement step is displayed on the screen of the apparatus in the form of a relevance index. This index can be displayed as a relevance mark or in graphical form. For example, a relevance bar the length of which is proportional to the relevance index may be displayed on the screen of the apparatus. Advantageously, the colour of this bar may serve to determine zones for this relevance index, for example a green bar if the index is sufficient for high-quality calibration, orange if the index is usable although insufficient to ensure the best calibration and red if it is unusable.

The flow diagram in FIG. 3 illustrates the method for calculating the relevance index according to an example embodiment of the invention. A first step 3.1 consists of a calculation of the histograms of the right and left images. The spread of this histogram gives the first index in relation to the level of detail of the scene. An excessively uniform scene gives a tight histogram while a well spread out histogram is the sign that the scene has a variability of colours and brightnesses a priori affording good correlation.

A second step consists of measuring a grid of parallaxes on the scene from the images captured. To do this, the image is divided into a plurality of areas. This division may be of any type. According to the example embodiment of the invention, the division is done according to a grid like the one illustrated in FIG. 4. The image 4.1 is here divided into nine areas 4.2 of the same size.

So as to minimise the computing times necessary, a parallax index is calculated for each area according to the method illustrated by FIG. 5. According to this embodiment, the area 5.2 is reduced to a single line 5.4 by an operation such as the sum of the columns 5.3. The line thus obtained is compared by correlation of the equivalent line of the other image. The correlation is made, for example, by adding the absolute values of the differences. This sum gives a correlation index. The translation that gives the minimum of these correlation indices is taken as the parallax index.

Advantageously, the calculation of these correlation indices is used to also calculate the median value of the correlation indices and then the difference between the minimum value adopted and this median value. This difference is another index of the level of detail of the image and its appropriateness with the reliability of the correlation. This is because, if a minimum correlation index is obtained that is appreciably different from the median value of the correlation indices obtained for the adjacent translation values, it can be said that the correlation is reliable and that the level of detail is therefore relevant. On the other hand, if the minimum value is slightly different from other values of the correlation index, it is that the level of detail does not allow reliable correlation.

Two values are therefore obtained at the end of step 3.2, a parallax index that is a translation value corresponding to a minimum correlation index and a correlation reliability index corresponding to the difference between the minimum correlation index and the median value of the correlation indices. The correlation reliability index is used conjointly with the histogram spread index in order to calculate a global detail index of the image during a step 3.3. For example, a weighted average of the correlation reliability indices of each area and of the histogram spread index is calculated.

The parallax indices of the various areas are used for calculating a distance index during step 3.4. These parallax indices are a good approximation of the distance of the scene. Since calibration has not yet taken place, reliable information on the depth cannot yet be derived from this; however, a good idea is obtained all the same. Advantageously, the calibration process can be applied successively, which makes it possible, at each calibration step, to take advantage of input images already "pre-calibrated", and hence there is a gain in precision. Values of the parallax indices are also derived from the distribution information. If these values have great variability, this means that there exist planes with various depths in the image and therefore objects in the foreground. This aspect has a negative impact on the calibration. A relevant scene for calibration is a scene producing uniformly low values of the parallax indices for all the areas. A distance index is therefore calculated that will be all the greater when the parallax indices are uniformly small.

The relevance index is finally calculated according to the detail index obtained by step 3.3 and the distance index obtained at step 3.4. Advantageously, this index is a weighted average between the two indices.

It can be seen that, by virtue of the method described, it is possible for a user to effect a calibration of a stereoscopic photography device at any moment, this calibration allowing use of the stereoscopy by correcting defects in the system. Advantageously, the user is guided during the choice of the scene for calibration. This method can be used in any type of apparatus, in particular for the general public, such as photographic apparatus, video cameras, telephones or game consoles.

The invention claimed is:

1. Calibration method for calibrating a stereoscopic photography device having a right camera for capturing a right-hand image and a left camera for capturing a left-hand image, at least four orders from lowest to highest of defects appearing between the right and left hand images, the defects comprising at least a global translation offset of the image, a horizontal and vertical trapezium deformation, a rotation, and a zoom factor, each of these defects being able to be corrected by applying a transformation to at least one of the two captured images, the method comprising the steps of:
    calculating a relevance index to determine a scene for implementing the calibration method, and for the determined scene performing the following:
    a) estimating the correction parameters for the defects of at least one lower order;
    b) estimating the correction parameters for the defects of a higher order using the estimated correction parameters for the defects of the at least one lower order;
    c) re-estimating the correction parameters for the defects of the at least one lower order using the estimated correction parameters for the defects of the higher order;
    d) re-estimating the correction parameters for the defects of the higher order using the re-estimated correction parameters for the defects of the at least one lower order; and
    e) estimating the correction parameters for the defects of a next higher order using the re-estimated correction parameters for the at least two lower orders.

2. Calibration method according to claim 1, further comprising a fifth order of defects to be corrected of
    a barrel or pincushion distortion.

3. Calibration method according to claim 1, characterized in that the calculation of an index of relevance of the scene comprises the steps of:
    calculating histograms of the right and left images, each histogram comprising a spread relating to the level of detail of a scene;

calculating, for each area of the plurality of areas of the left and right images, a parallax index and a correlation reliability index;

calculating, from the spreads of the histograms and from the correlation reliability indices, a detail index of the scene;

calculating, from the parallax indices, a distance index that will be greater, the more the parallax indices are uniformly low; and calculating, from the detail index and the distance index the relevance index.

4. Calibration method according to claim 1, further comprising a step of repeating steps c) and d) until convergence of the estimation of the parameters is obtained, before proceeding to step e).

5. Calibration method according to claim 1, further comprising a step of displaying the calculated relevance index on a screen of the device.

6. Calibration method according to claim 5, wherein the relevance index is a relevance bar the length of which is proportional to the relevance index.

7. Calibration method according to claim 6, wherein the color of the bar is used to determine zones for the relevance index.

* * * * *